United States Patent
Monk

(10) Patent No.: US 10,696,315 B2
(45) Date of Patent: Jun. 30, 2020

(54) LIVESTOCK STALL AND TACK CART

(71) Applicant: Clint Dale Monk, Yuma, CO (US)

(72) Inventor: Clint Dale Monk, Yuma, CO (US)

( * ) Notice: Subject to any disclaimer, the term of this patent is extended or adjusted under 35 U.S.C. 154(b) by 489 days.

(21) Appl. No.: 15/458,302

(22) Filed: Mar. 14, 2017

(65) Prior Publication Data
US 2017/0267268 A1    Sep. 21, 2017

Related U.S. Application Data

(60) Provisional application No. 62/309,781, filed on Mar. 17, 2016.

(51) Int. Cl.
| | |
|---|---|
| *B62B 3/00* | (2006.01) |
| *B62B 3/10* | (2006.01) |
| *A01K 1/00* | (2006.01) |
| *A01K 29/00* | (2006.01) |
| *B62B 3/04* | (2006.01) |
| *B62B 3/12* | (2006.01) |

(52) U.S. Cl.
CPC ............ *B62B 3/108* (2013.01); *A01K 1/0005* (2013.01); *A01K 1/0035* (2013.01); *A01K 29/00* (2013.01); *B62B 3/001* (2013.01); *B62B 3/04* (2013.01); *B62B 3/12* (2013.01); *B62B 2301/04* (2013.01)

(58) Field of Classification Search
CPC .......... B62K 3/108; B62K 3/001; B62K 3/04; B62K 3/12
See application file for complete search history.

(56) References Cited

U.S. PATENT DOCUMENTS

| | | | | |
|---|---|---|---|---|
| 2,420,847 A | * | 5/1947 | Trabucco | B62D 13/02 280/137.505 |
| 4,545,592 A | * | 10/1985 | Taskovic | A45C 13/385 280/35 |
| 4,576,389 A | * | 3/1986 | Villaveces | B62B 3/00 267/41 |
| 4,796,909 A | * | 1/1989 | Kirkendall | B62B 3/02 180/906 |
| 5,249,823 A | * | 10/1993 | McCoy | B62B 3/02 280/144 |
| 5,299,817 A | * | 4/1994 | Chang | B62B 5/0083 280/35 |
| 5,449,224 A | * | 9/1995 | Johnson | B62B 3/04 280/47.34 |
| 5,599,031 A | * | 2/1997 | Hodges | B62B 5/0083 280/35 |

(Continued)

*Primary Examiner* — Hau V Phan
(74) *Attorney, Agent, or Firm* — Sheridan Ross PC

(57) ABSTRACT

A stall and tack cart for transporting livestock is provided. The livestock stall and tack cart generally incorporates telescoping members and stall carriers protruding vertically therefrom. The telescoping members allow for a length of the livestock stall and tack cart to be adjusted such that the stall carriers may hold one or more livestock stalls securely while the stall and tack cart is in motion. The devices and methods provided have the advantages of being as durable and capable of carrying heavy loads as currently existing livestock transportation solutions, but allow equipment for one or more livestock animals to be quickly and easily transported, for example, from a waiting or confinement area to an exhibition space, including through crowded, obstructed, or tight passages.

13 Claims, 16 Drawing Sheets

(56) References Cited

U.S. PATENT DOCUMENTS

| | | | | |
|---|---|---|---|---|
| 6,116,533 A * | 9/2000 | Elder | B65H 49/325 |
| | | | | 242/557 |
| 6,419,244 B2 * | 7/2002 | Meabon | B62B 1/002 |
| | | | | 280/47.17 |
| 6,425,591 B1 * | 7/2002 | Ball | B62B 3/007 |
| | | | | 280/39 |
| 6,523,776 B1 * | 2/2003 | Elder | B65H 49/32 |
| | | | | 211/85.5 |
| 6,783,147 B1 * | 8/2004 | Green, Sr. | B62B 1/20 |
| | | | | 280/47.26 |
| 7,441,783 B2 * | 10/2008 | Clark | B62B 3/001 |
| | | | | 280/30 |
| 8,839,743 B2 | 9/2014 | Chandler | |
| 2003/0030239 A1 * | 2/2003 | Woerner | B62B 3/002 |
| | | | | 280/47.35 |
| 2011/0271911 A1 * | 11/2011 | Chandler | A01K 1/0236 |
| | | | | 119/519 |
| 2013/0270795 A1 * | 10/2013 | Tyson | B63C 13/00 |
| | | | | 280/414.2 |
| 2015/0028616 A1 * | 1/2015 | Kroening | B60B 33/0002 |
| | | | | 296/3 |

\* cited by examiner

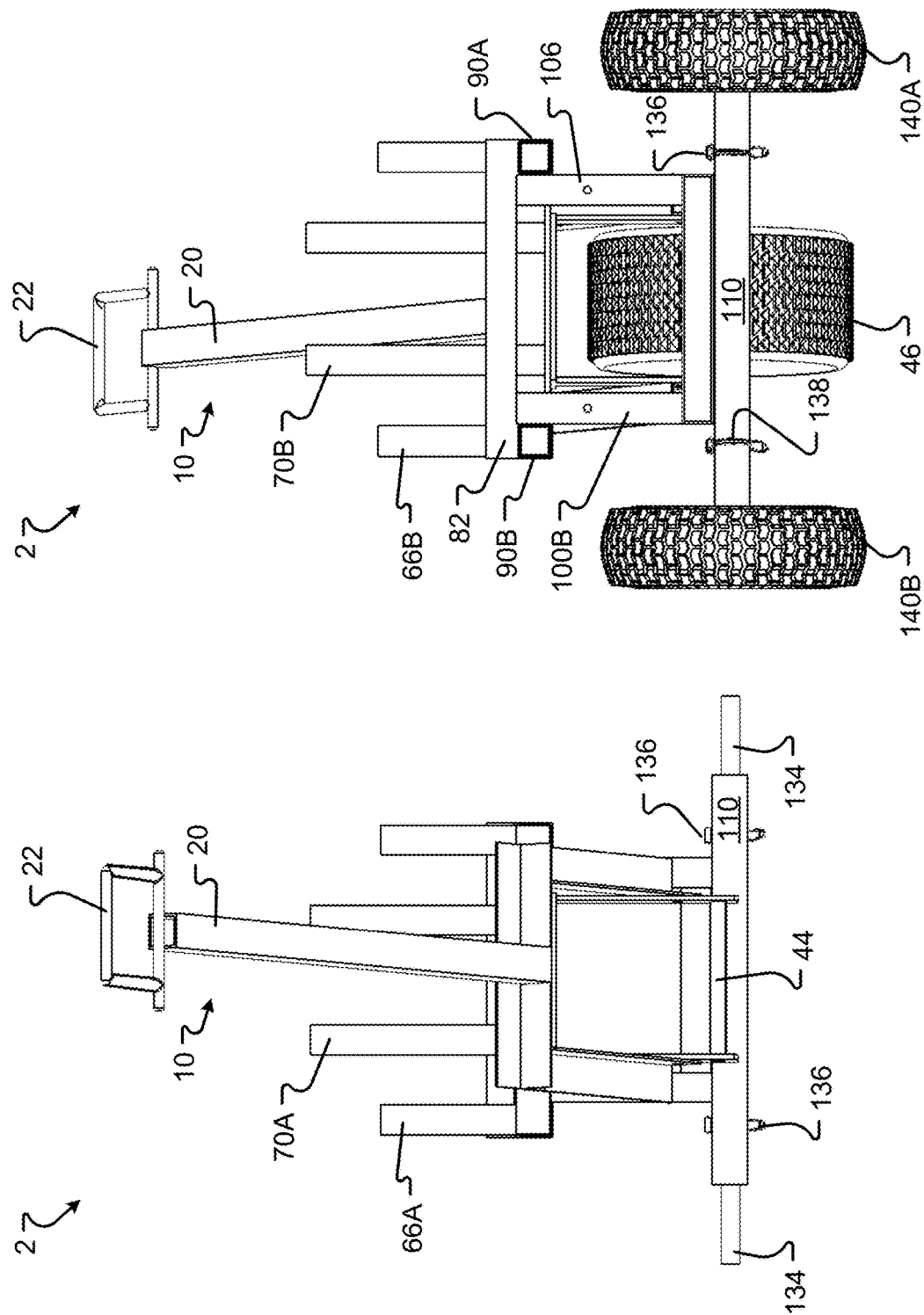

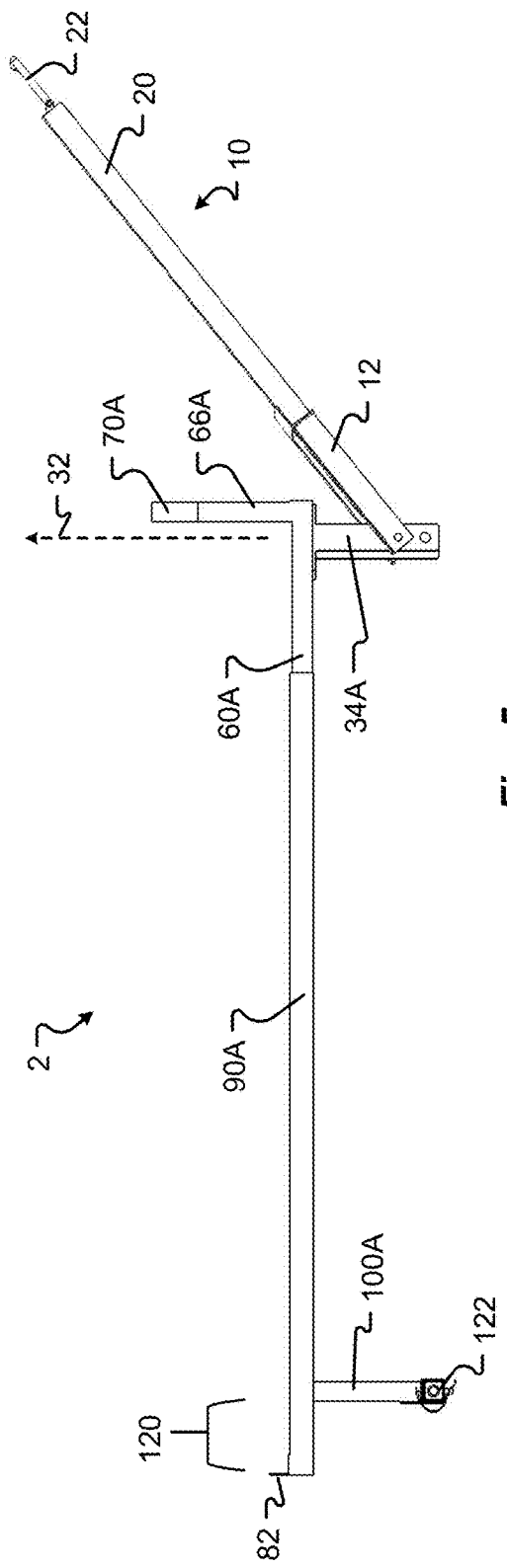
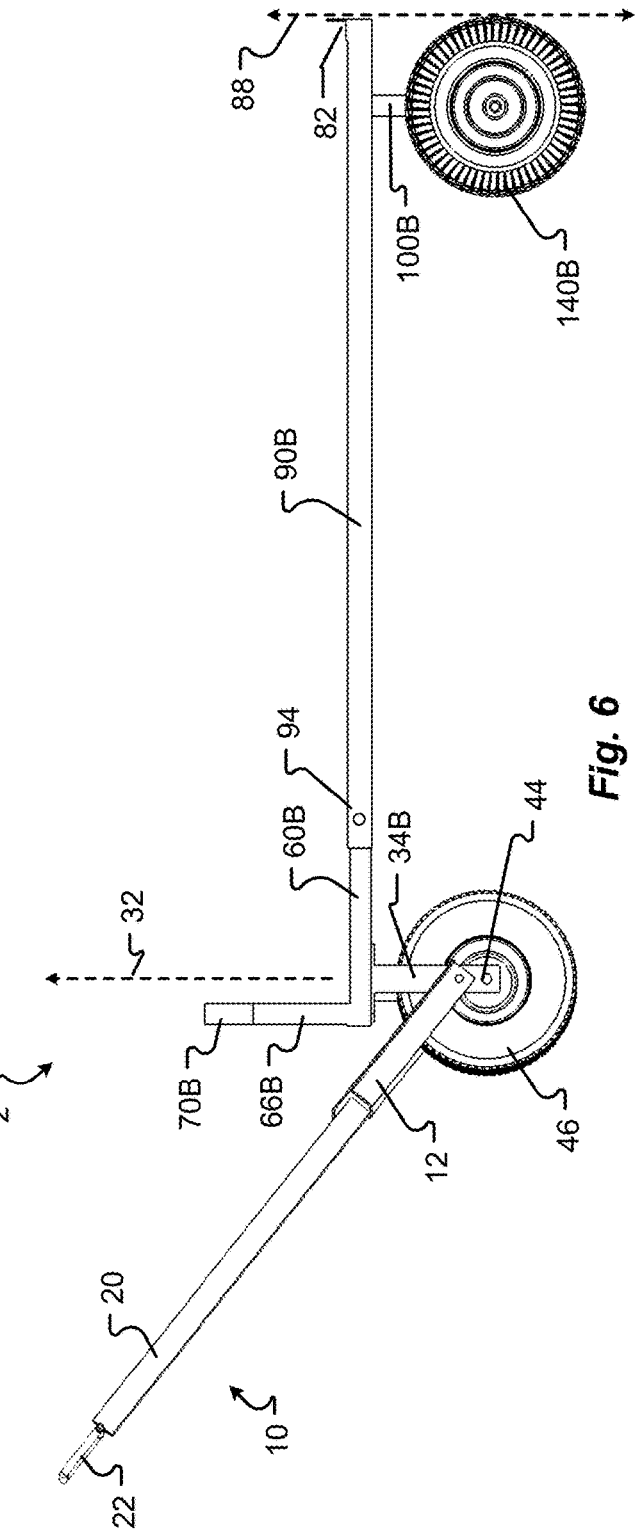

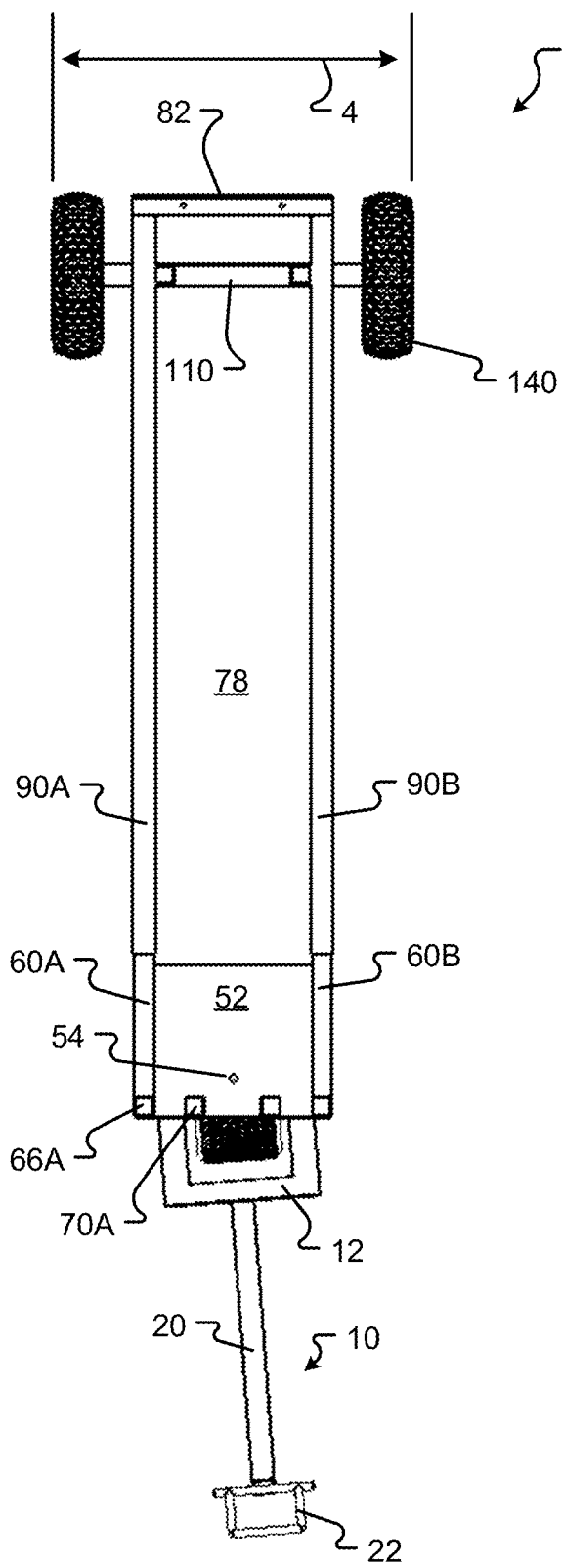
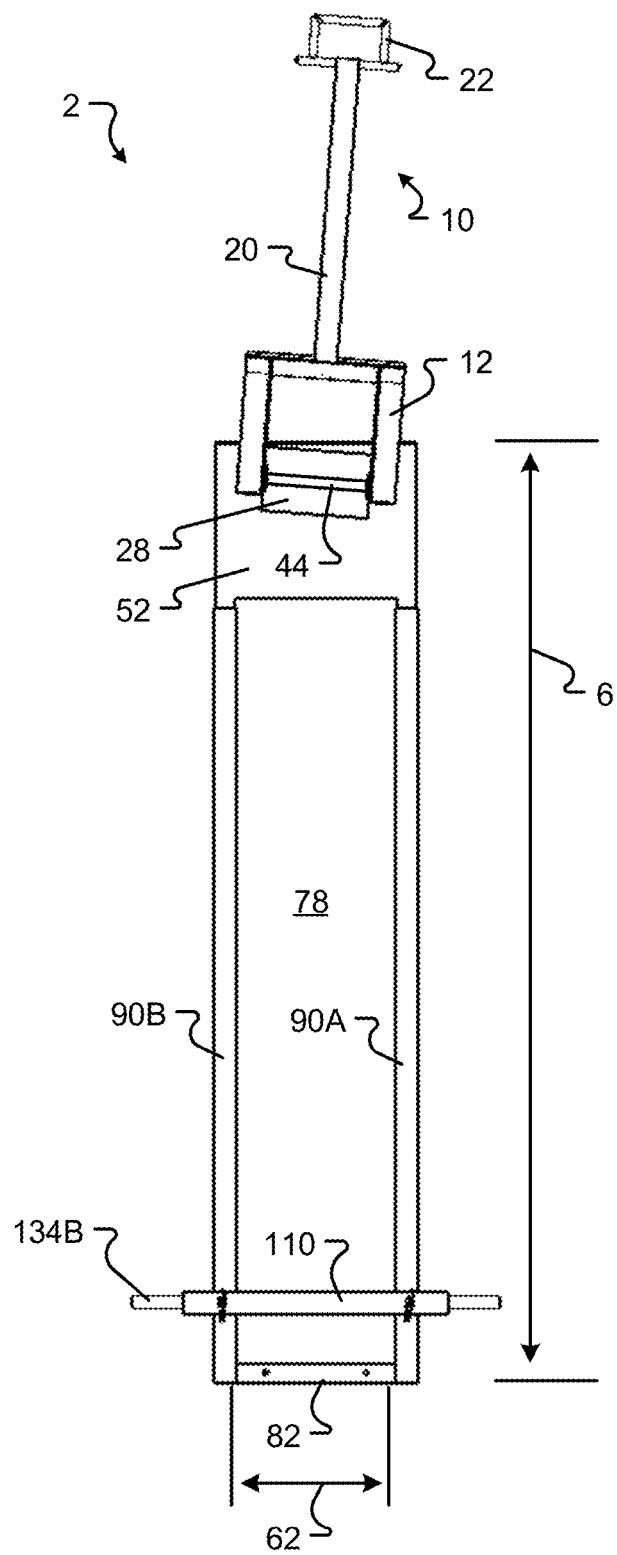
Fig. 7
Fig. 8

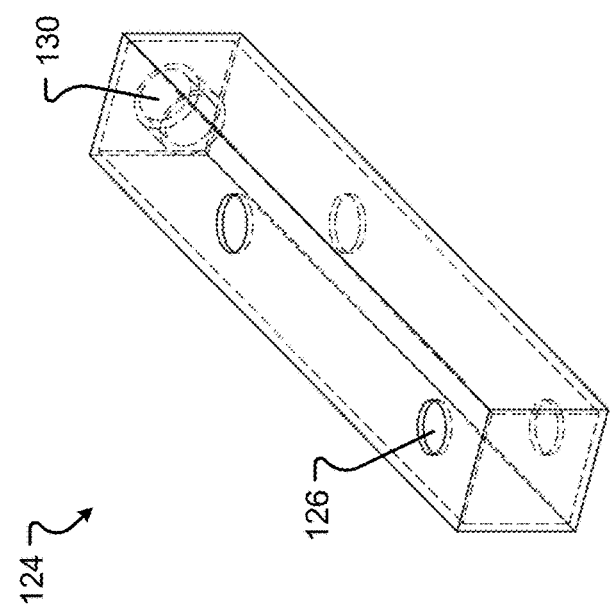
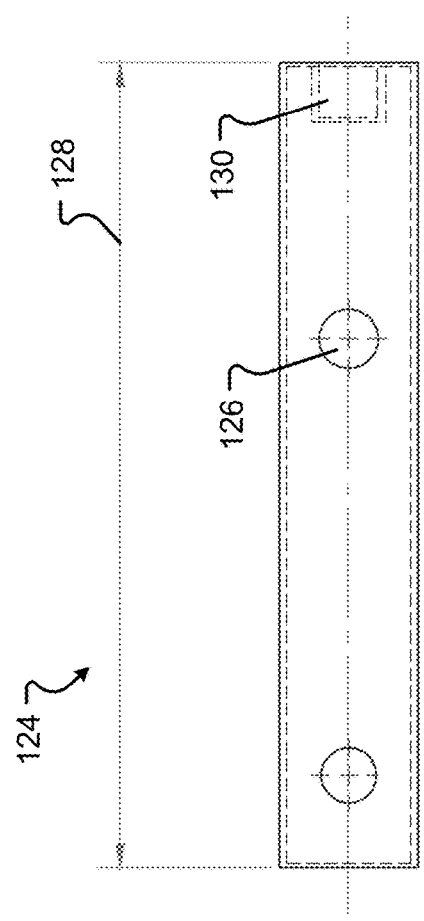
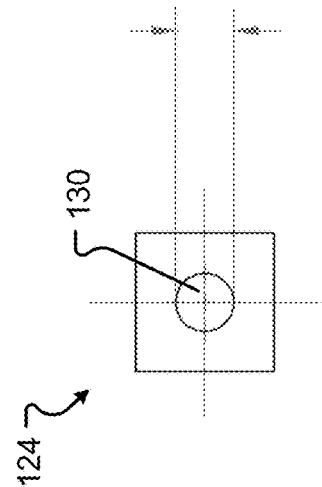
*Fig. 17*

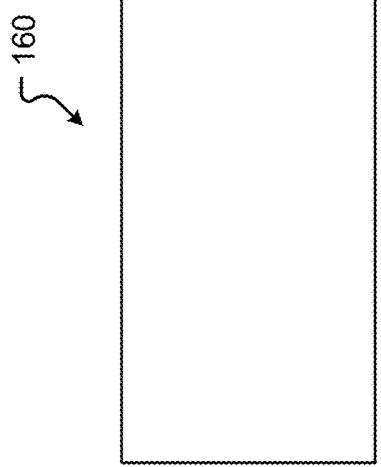
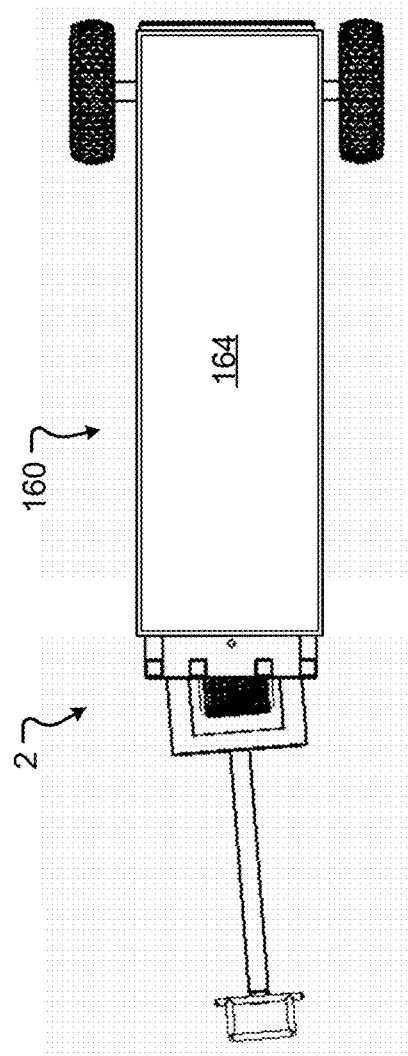
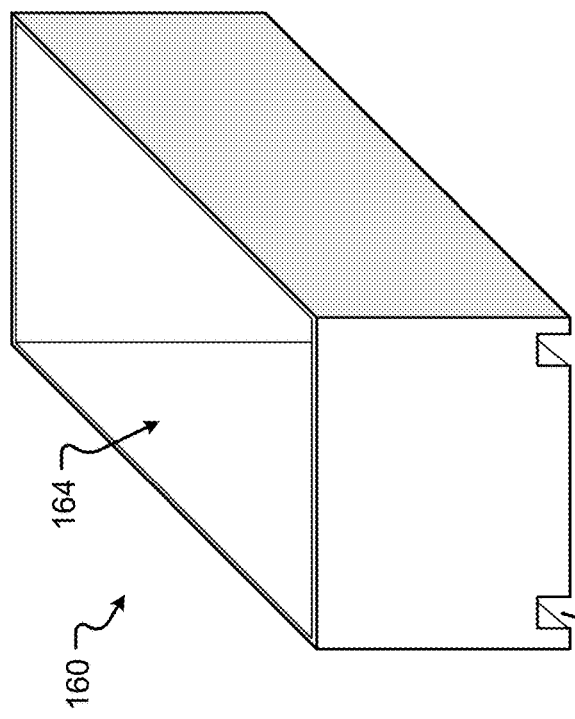
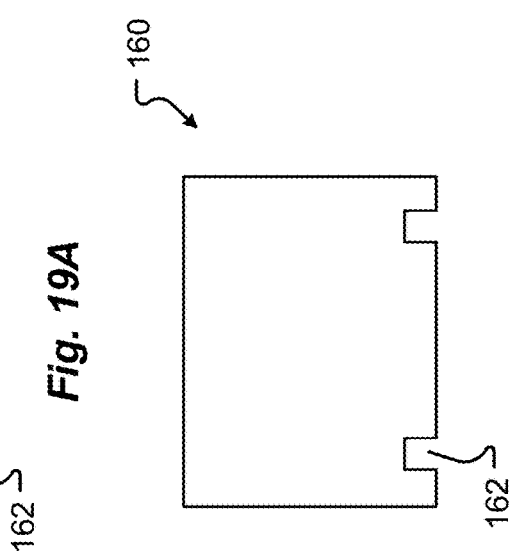
Fig. 19A
Fig. 19B
Fig. 19C
Fig. 19D

LIVESTOCK STALL AND TACK CART

CROSS-REFERENCE TO RELATED APPLICATIONS

This application claims priority under 35 U.S.C. § 119(e) to U.S. Provisional Patent Application Ser. No. 62/309,781, filed Mar. 17, 2016, which is incorporated by reference herein in its entirety.

FIELD OF THE INVENTION

Embodiments of the present invention are generally related to apparatus for transporting livestock and associated equipment. More specifically, the present invention relates to carts that carry livestock, livestock stalls, and other heavy loads while maintaining a relatively narrow cross-section.

BACKGROUND

The exhibition of livestock at livestock shows and auctions requires that livestock equipment, such as stalls and tack, be moved relatively quickly from a corral, pen, or other waiting area to an exhibition space, where livestock animals can, where appropriate, be judged and/or bid upon. Stalls used to show livestock typically must be transported within the exhibition space by hand. The stalls are transported to the livestock show in a disassembled condition and reassembled at an assigned location within the exhibition space. Livestock stalls generally include two stall dividers which separate livestock at the show. Each dividers typically includes at least two vertical support members which may include upper and lower openings. Horizontal members and/or a mesh are positioned between each of the vertical support members. The upper openings of the vertical support members receive transverse members. When the stall is assembled, the stall dividers are arranged generally parallel and spaced apart. A portion of the transverse members is received in the vertical support members. The transverse members, which have an L shape, are then interconnected to form an end of the stall transverse to the stall dividers.

After livestock animals are judged or sold, the livestock equipment must then also be moved from the exhibition space. This is particularly true of larger shows and auctions, which may be held in very large event spaces and which may require that hundreds or thousands of livestock animals be exhibited, judged, and/or sold in a single day.

Various apparatuses and methods for transporting livestock equipment are known and described in the art. For example, U.S. Pat. No. 8,839,743 to Chandler, the entirety of which is hereby incorporated by reference, discloses a cart for transporting livestock equipment having first and second stall dividers and two dollies.

However, current livestock transportation apparatuses and methods possess several drawbacks. Many of the solutions of the prior art are directed to larger cages, portable corrals, portable pens, etc., intended for the transportation of equipment for a large number of animals over a comparatively great distance, i.e., by means of a vehicle. Such solutions are not suitable for transporting equipment for one or a few animals from a waiting area to an exhibition space in a timely manner. Those solutions that do exist for transporting equipment for one or a few animals from a waiting area to an exhibition space are often cumbersome or have limited weight capacity, and in particular, may have a substantial cross-section unsuitable for navigating through a crowded space as may exist at a large livestock show or auction.

Moreover, current solutions have limited maneuverability and may not be compatible with trailers or other transportation mechanisms used to transport livestock animals and livestock equipment to the waiting area.

There is thus a need in the art for devices for transporting livestock equipment that can be utilized in conjunction with existing livestock stalls and other equipment and have substantial weight capacity. It is also advantageous for such devices to be highly maneuverable and to have a narrow cross-section for navigating crowded or obstructed spaces. It is further advantageous for such devices to have an adjustable length and width to hold livestock stalls securely in place.

SUMMARY OF THE INVENTION

It is one aspect of embodiments of the present invention to provide a livestock stall and tack cart with an adjustable length and an adjustable width.

One aspect of the present invention is a cart with an adjustable length. In one embodiment, the cart has a first width. In a second embodiment, the cart has a second larger width. Optionally, at least rear wheels of the cart are spaced separated by a distance selected by a user.

It is another aspect of the present invention to provide a cart with an adjustable width. In one embodiment, the cart has a fixed length. In another embodiment, the length of the cart may be adjusted by a user.

Another aspect of the present invention is a grate plate adapted for use with carts of the present invention. The grate plate includes a frame and a mesh. The mesh may comprise metal wires. Optionally, the frame may be sized to fit over two longitudinal members of the cart.

Yet another aspect of the present invention is a trough. In one embodiment, the trough includes a bottom portion with two grooves that are substantially parallel. The grooves are sized to receive two longitudinal members of carts of embodiments of the present invention.

It is one aspect of the present invention to provide a cart with an adjustable length and width. The cart generally comprises: (1) a front frame including: (i) a planar member; (ii) two front longitudinal members interconnected to the planar member; and (iii) at least two protruding members arranged substantially vertically with respect to the planar member; (2) a bracket pivotally interconnected to the planar member; (3) a front wheel interconnected to the bracket; (4) a handle pivotally interconnected to the bracket; (5) a rear frame including: (i) a transverse member; (ii) two rear longitudinal members interconnected to the transverse member, each of the rear longitudinal members having a substantially hollow interior and an aperture distal to the transverse member, the aperture sized to selectively receive a corresponding front longitudinal member such that a length of the cart is adjustable; (iii) a vertical member extending downwardly from each of the two rear longitudinal members; and (iv) an axle support interconnected to the two vertical members, the axle support having an interior space accessible by opposing openings; and (6) two axle carriers each including a rear wheel, wherein each axle carrier is selectively receivable within one of the opposing openings of the axle support such that a width of cart is adjustable. In one embodiment, the at least two protruding members are sized to be received within a portion of a livestock stall. Optionally, the at least two protruding members includes two outer members and two inner members. In another embodiment, the two inner members are substantially hollow to receive a handle of a tool.

In one embodiment, the car further comprises a lock aperture in at least one of the rear longitudinal members. The lock aperture is adapted to receive a fixture to fix one of the front longitudinal members within the hollow interior of the rear longitudinal member.

In another embodiment, each of the two vertical members of the rear frame is substantially hollow and includes an opening to receive a drop pipe. Additionally, each of the two vertical members may include a transverse aperture for a fixture to interconnect the drop pipe to the cart. In one embodiment, the drop pipe is sized to be received within a portion of the livestock stall.

In one embodiment, each axle carrier includes an axle receiver, the axle receiver having a generally cylindrical shape extending within an interior of the axle receiver. Optionally, the cart may further include a first rear axle portion interconnected to a first one of the two axle receivers and a second rear axle portion interconnected to a second one of the two axle receivers. Accordingly, a first one of the two rear wheels may be interconnected to the first rear axle portion and a second one of the two rear wheels may be interconnected to the second rear axle portion. Additionally, or alternatively, each axle carrier further comprises at least two apertures formed transverse to a longitudinal axis of each axle carrier, the at least two apertures alignable with at least one aperture formed in the axle support. The cart may further include a fixture received within an aperture of an axle carrier aligned with an aperture of the axle support.

In one embodiment, the two vertical members of the rear frame are spaced from the transverse member by an amount about equal to a diameter of the rear wheels. In this manner, the rear wheels and the transverse member are aligned with a second plane substantially perpendicular to the planar member. Thus, the cart may be positioned in a vertical configuration with the transverse member and the two rear wheels in contact with the ground, such as for storage.

Optionally, the cart may include one or more of a grate plate and a livestock trough. The grate plate may be sized to be retained by the front and rear longitudinal members. In one embodiment the grate plate includes a frame which supports a mesh. The livestock trough optionally has grooves adapted to receive one or more of the front and rear longitudinal members. The grooves are substantially parallel. Optionally the grooves have a width about equal to a width of the rear longitudinal members. In one embodiment, the grooves have a depth selected to receive at least a portion of the rear longitudinal members.

It is another aspect of the present invention to provide a tack cart. The tack cart generally includes, but is not limited to: (1) a rear axle; (2) a front axle; (3) two telescoping members extending horizontally between the rear and front axles and adjustably interconnecting the rear and front axles, the two telescoping members defining a plane; (4) a front wheel, interconnected to the front axle; (5) two rear wheels, interconnected to the rear axle; (6) a handle, interconnected to the front axle at a pivot point; and (7) two stall carriers protruding substantially vertically from the plane, the stall carriers adapted for interconnection to a livestock stall to be transported by the tack cart. Optionally, one or more of the front wheel and the rear wheel may comprise airless tires.

In one embodiment, at least one telescoping member extends behind the rear axle to define an equipment carrier. The equipment carrier includes a transverse member protruding vertically from the at least one telescoping member at a point behind the rear axle.

In one embodiment, a length of the rear axle is adjustable. In one embodiment, each of the two telescoping members further comprises: (i) a rear longitudinal member with a substantially hollow interior and an aperture distal to the rear axle; and (ii) a front longitudinal member with a width no greater than a width of the aperture of the rear longitudinal member. In this embodiment, the front longitudinal member is adjustably receivable within the hollow interior of the rear longitudinal member. Optionally, the tack cart includes an aperture in the rear longitudinal member to receive a fixture to fix the front longitudinal member in a predetermined position within the hollow interior.

Optionally, the tack cart may further include one or more of: (i) a grate plate to be retained by the two telescoping members; and (ii) a livestock trough having grooves adapted to receive the two telescoping members.

These and other advantages will be apparent from the disclosure contained herein.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

Unless otherwise indicated, all numbers expressing quantities, dimensions, conditions, and so forth used in the specification and claims are to be understood as being modified in all instances by the term "about."

The embodiments and configurations described herein are neither complete nor exhaustive. As will be appreciated, other embodiments of the invention are possible utilizing, alone or in combination, one or more of the features set forth above or described in detail below.

BRIEF DESCRIPTION OF THE DRAWINGS

The accompanying drawings, which are incorporated herein and constitute a part of the specification, illustrate embodiments of the invention and together with the Summary of the Invention given above and the Detailed Description given below serve to explain the principles of these embodiments. In certain instances, details that are not necessary for an understanding of the disclosure or that render other details difficult to perceive may have been omitted. It should be understood, of course, that the present invention is not necessarily limited to the particular embodiments illustrated herein. Additionally, it should be understood that the drawings are not necessarily to scale.

FIG. 3 is a front elevation view of the cart of FIG. 1 with the wheels removed for clarity;

FIG. 4 is a rear elevation view of the cart of FIG. 1;

FIG. 5 is a right side elevation view of the cart of FIG. 1 with the wheels removed for clarity;

FIG. 6 is a left side elevation view of the cart of FIG. 1;

FIG. 7 is a top plan view of the cart of FIG. 1;

FIG. 8 is a bottom plan view of the cart of FIG. 1 with the wheels removed for clarity;

FIG. 17 illustrates a rear axle carrier according to one embodiment of the present invention in different views;

FIG. 19A is a perspective view of a trough of an embodiment of the present invention, the trough including recesses sized to receive the longitudinal members of the front and rear frame;

FIG. 19B is a front elevation view of the trough of FIG. 19A;

FIG. 19C is a right side elevation view of the trough of FIG. 19A;

FIG. 19D is a top plan view of the trough of FIG. 19A positioned on the cart of FIG. 1.

Figure 1:
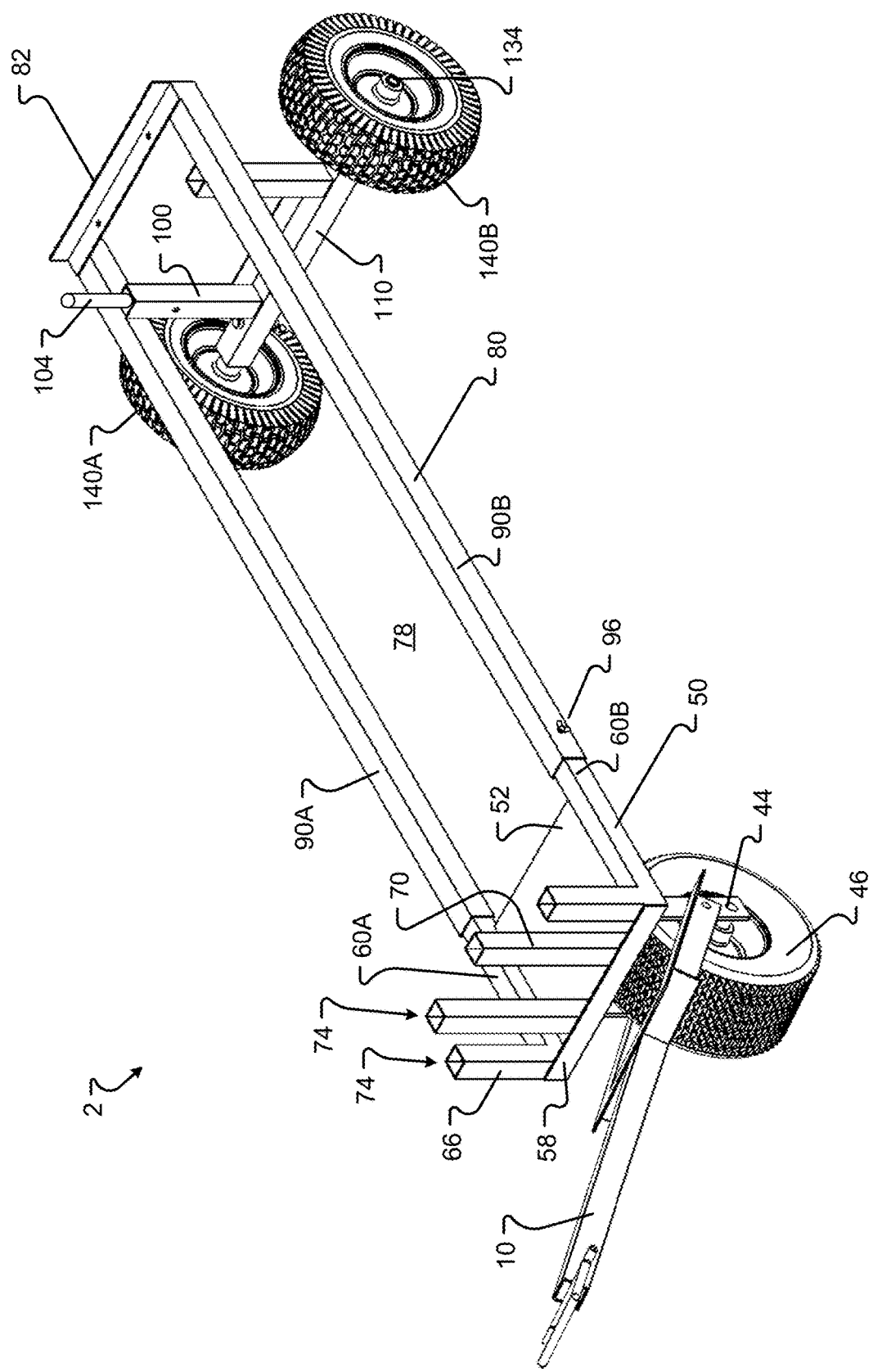
FIG. 1 is a front perspective view of a livestock stall and tack cart of one embodiment of the present invention with the cart in a retracted configuration.

Similar components and/or features may have the same reference number. Components of the same type may be distinguished by a letter following the reference number. If only the reference number is used, the description is applicable to any one of the similar components having the same reference number.

To assist in the understanding of one embodiment of the present invention the following list of components and associated numbering found in the drawings is provided herein:

| Number | Component |
| --- | --- |
| 2 | Cart |
| 4 | Width |
| 6 | Length |
| 10 | Handle |
| 12 | Coupling |
| 14 | Length |
| 16 | Interior width |
| 20 | Tongue |
| 21 | Length |
| 22 | Ring |
| 26 | Bracket |

-continued

| Number | Component |
| --- | --- |
| 28 | Plate member |
| 30 | Pivot aperture |
| 32 | Vertical axis |
| 34 | Supports |
| 36 | Handle aperture |
| 38 | Axle aperture |
| 44 | Front axle |
| 46 | Front wheel |
| 50 | Front frame |
| 52 | Planar member |
| 54 | Aperture |
| 56 | Width |
| 58 | Transverse member |
| 60 | Front longitudinal members |
| 62 | Interior width |
| 64 | Length |
| 66 | Outer protruding members |
| 68 | Length |
| 70 | Inner protruding members |
| 72 | Length |
| 74 | Chambers |
| 78 | Cavity between longitudinal members |
| 80 | Rear frame |
| 82 | Transverse member |
| 88 | Plane defined by transverse member and rear wheels |
| 90 | Rear longitudinal members |
| 92 | Aperture for front longitudinal members |
| 94 | Lock aperture |
| 96 | Fastener |
| 98 | Length |
| 100 | Vertical members |
| 102 | Opening |
| 104 | Drop pipe |
| 106 | Pin fitting |
| 110 | Axle support |
| 112 | Apertures for axle carrier |
| 114 | Fixture aperture |
| 116 | Length |
| 118 | Distance from transverse member |
| 120 | Rear equipment carrier |
| 124 | Axle carrier |
| 126 | Fixture aperture |
| 128 | Length |
| 130 | Receiver for axle |
| 134 | Rear axles |
| 136 | Fixture or bolt |
| 138 | Retention element |
| 140 | Rear wheel |
| 150 | Grate plate |
| 152 | Frame |
| 154 | Mesh |
| 156 | Bucket |
| 158 | Fan |
| 160 | Trough |
| 162 | Grooves |
| 164 | Chamber |

DETAILED DESCRIPTION

Unless defined otherwise, all technical and scientific terms used herein have the same meaning as is commonly understood by one of ordinary skill in the art. All patents, applications, published applications, and other publications to which reference is made herein are incorporated by reference in their entirety. In the event that there is a plurality of definitions for a term herein, the definition provided in the Summary of the Invention prevails unless otherwise stated.

Referring now to FIGS. 1-8, a livestock stall and tack cart 2 according to embodiments of the present disclosure is illustrated in a retracted configuration. The cart 2 has an adjustable length 6 and width 4 as generally illustrated in FIGS. 9-12. The cart 2 generally includes: a handle 10, a bracket 26 for a front wheel 46, a front frame 50, a rear frame 80, and rear axle carriers 124 for rear wheels 140.

In one embodiment, the front and rear wheels 46, 140 are airless and provide a weight capacity of at least about 400 pounds for the cart 2. In another embodiment, the wheels enable the cart to support at least about 900 pounds. Optionally, when a single front wheel 46 is used, the front wheel is larger than each rear wheel 140. In one embodiment, the wheels 46, 140 and bearings of the cart 2 may allow the cart 2 to have a comparatively small turning radius, allowing for greater maneuverability in tight spaces, such as at livestock shows.

The handle 10 is interconnected to the cart 2 such that a free end of the handle 10 may pivot around a substantially horizontal axis. Optionally, the handle 10 may be quickly released from the cart 2 by a user. In one embodiment, the handle 10 is pivotally interconnected to the bracket 26. In another embodiment, the handle 10 is interconnected to the front frame 50.

The bracket 26 generally includes a plate member 28 and supports 34 extending from the plate member 28. The supports 28 include apertures 38 to receive an axle 44 for the front wheel 46. In one embodiment, the handle 10 is interconnected to the supports 34 above the axle 44. However, the handle 10 may be interconnected to the cart 2 and the bracket 26 in other manners. Although only one front wheel 46 is illustrated, in another embodiment two front wheels are interconnected to the axle 44.

The bracket 26 is pivotally interconnected to the front frame 50. In one embodiment, an aperture 30 in the plate member 28 defines a generally vertical axis 32 transverse to the front axle 44. In this manner, a user may pull and steer the cart 2 by the handle 10 with ease through crowded, obstructed, or tight spaces.

The front frame 50 generally includes a planar member 52, a transverse member 58, and front longitudinal members 60. Protruding members 66, 70 extend substantially vertically from the front frame 50. These protruding members 66, 70, which are also referred to herein as "stall carriers," prevent a livestock stall transported by the cart 2 from moving while the cart is in motion. In one embodiment, the front frame 50 includes inner protruding members 70 between outer protruding member 66. The protruding members 66, 70 are spaced such that sections of a livestock stall may fit between adjacent members 66, 70 and/or 70A, 70B. Optionally, the inner protruding members 70 are longer than the outer members 66. This may facilitate adding and removing equipment from the cart 2.

The protruding members 66, 70 may be substantially hollow with interior chambers 74. The chambers 74 may be used to carry a variety of tools. For example, in one embodiment, the handle of a tool, such as a rake or broom, may be received within one of the chambers 74. Optionally, the chambers 74 can receive a rod for an electric fan as illustrated in FIG. 20D.

The rear frame 80 generally includes a transverse member 82 with a vertical projection, rear longitudinal members 90, and vertical members 100 for an axle support 110. Although not illustrated, the rear frame may optionally include protruding members 66, 70 that are the same as, or similar to, the protruding members 66, 70 of the front frame 50.

The rear longitudinal members 90 are adapted to slidingly interconnect to the front longitudinal members 60. In one embodiment, the front and rear longitudinal members 60, 90 have a telescoping relationship to allow the distance between the front frame 50 and rear frame 80, i.e. the length 6 of the cart 2, to be adjusted by a user. This ability to adjust the cart length 6 is advantageous in that the cart 2 can be configured to exactly accommodate one or more livestock stalls. For example, a user of the cart 2 may thus adjust the relationship of front and rear longitudinal members 60, 90 such that the protruding members 66, 70 abut a front end and the vertical projection of the transverse member 82 abuts a rear end of one or more livestock stalls being transported as generally illustrated in FIG. 20D. Adjusting the length 6 thus ensures that the livestock stall is held securely in place and remains substantially stationary relative to the cart 2 while the cart 2 is in motion. In one embodiment, the front and rear longitudinal members 60, 90 may be adjusted such that the cart 2 has a length 6 of between about 5 feet and about 9 feet as may be suitable for accommodating existing livestock stalls. Those of skill in the art will recognize other lengths are suitable for the cart 2.

The longitudinal members 60, 90 are spaced apart to define a cavity or chamber 78. In one embodiment, the chamber 78 has an interior width 62 of between about 11 inches and about 14 inches, or more specifically, about 12.5 inches. In this manner, equipment, such as boxes and/or buckets may fit at least partially within the chamber 78 and be supported by the longitudinal members 60, 90 as generally illustrated in FIG. 20C.

In one embodiment, the rear longitudinal members 90 each include an aperture 92 (illustrated in FIG. 2) sized to receive at least a portion of the front longitudinal members 60 as generally illustrated in FIG. 1. Alternatively, in another embodiment, the front longitudinal members 60 may include apertures to receive the rear longitudinal members 90.

The front and rear longitudinal members 60, 90 may include retention mechanisms such that the position of the front frame 50 may be fixed with respect to the rear frame 80. In one embodiment, the front and rear longitudinal members 60, 90 include one or more means of fastening, such as clamps, bolts, and the like, for securing the front longitudinal members 60 in a fixed position to the rear longitudinal members 90. Accordingly, at least one of the rear longitudinal members 90 may include a lock aperture 94 to receive a fastener, such as a bolt 96. When received in the lock aperture 94, the bolt 96 may contact a portion of a front longitudinal member 60B to fix the front longitudinal member 60B within the aperture 92. Additionally, or alternatively, the front longitudinal members 60 may be frictionally retained by the rear longitudinal members 90. Regardless, in one embodiment, the length 6 of the cart 2 is incrementally adjustable by the user.

In one embodiment, one or more of the vertical members 100 are substantially hollow with an opening 102 at an upper end. In this manner, a user may insert a drop pipe 104. The drop pipe may have a diameter selected to fit into a stall to be carried by the cart 2. In this manner, the vertical members 100 can be adapted to vertically support stalls of a variety of different sizes produced by different manufacturers. The drop pipe 104 may be secured to the cart 2 by inserting a fixture through a pin fitting 106.

The axle support 110 is adapted to receive the axle carriers 124. In one embodiment, the axle carriers 124 are received within apertures 112 of the axle support 110 the same as, or similar to, the telescoping arrangement of the front and rear longitudinal members 60, 90. In this manner, the width 4 of the cart 2 may be selectively increased by the user.

The axle carriers 124 include a protruding rod or axle 134 to which the rear wheels 140 are interconnected. The axles 134 have a predetermined length. In one embodiment, the axle length is up to about 4.5 inches. However, one of skill in the art will appreciate that the axles may have any predetermined length to receive suitable rear wheels 140. Although the cart 2 is illustrated with fixed wheels, other types of wheels, such as wheels that may swivel around a vertical axis, may be used with the cart 2 of the present invention.

In one embodiment, the axle support 110 and the axle carriers 124 include alignable apertures 114, 126 that may receive a fixture 136, such as a bolt. Thus, the width 4 of the cart 2 may be selected, altered, and fixed by the user. Optionally, a retention element 138, such as a wire loop, may be use to retain the bolt 136 in position through aligned apertures 114, 126 of the axle support 110 and axle carriers 124.

Figure 12:
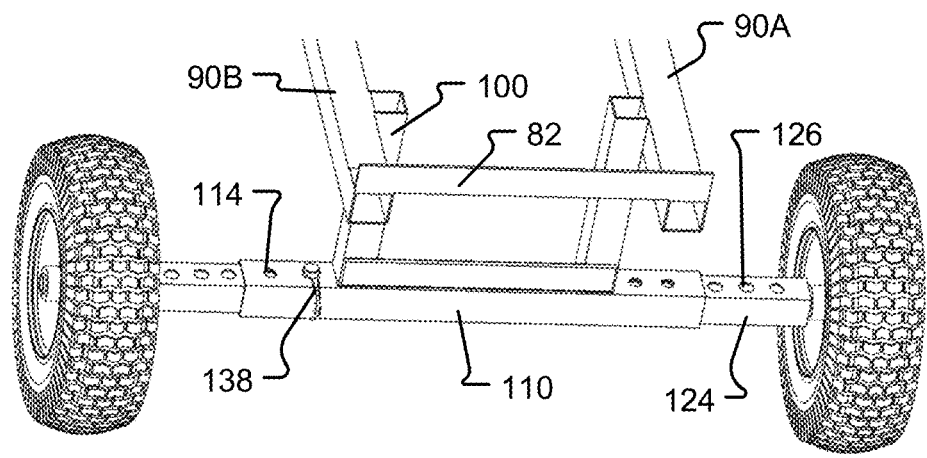
FIG. 12 is a rear perspective view of a portion of the cart of FIG. 9 showing the rear wheel carriers in an extended position.

One of skill in the art will appreciate that the axle support 110 and axle carriers 124 may include any number of apertures 114, 126 such that the width 4 of the cart 2 may be altered by the user in a plurality of predetermined increments. In one embodiment, illustrated in FIG. 2, each axle carrier 124 includes two apertures 126 that align with one aperture 114 in each half of the axle support 110. Alternatively, as illustrated in FIG. 12, each axle carrier 124 may include a plurality of apertures, such as five apertures 126 (two of which are hidden by the axle support 110 in FIG. 12) and each half of the axle support 110 may include a plurality of apertures 114, such as two corresponding apertures 114.

Notably, in one embodiment, the front and rear longitudinal members 60, 90 may be only about 16 inches apart at their widest point. Additionally, or alternatively, a width 4 (illustrated in FIG. 7) of the cart 2 including the rear wheels 140 may be not greater than about 2 feet, allowing the cart 2 to traverse crowded or tight passages and spaces. In one embodiment, the cart 2 of the present invention is sized to be loaded directly onto a livestock trailer and transported by a vehicle, without the need to remove the stalls from the cart 2.

Referring now to FIGS. 13-17, a variety of detailed views of elements of the cart 2 according to embodiments of the present disclosure are illustrated. Although various dimensions are provided to illustrate exemplary embodiments of the elements of the cart 2, it is expressly contemplated that dimensions may be varied in the cart 2 that still comport with the scope and spirit of the present disclosure.

Figure 13:
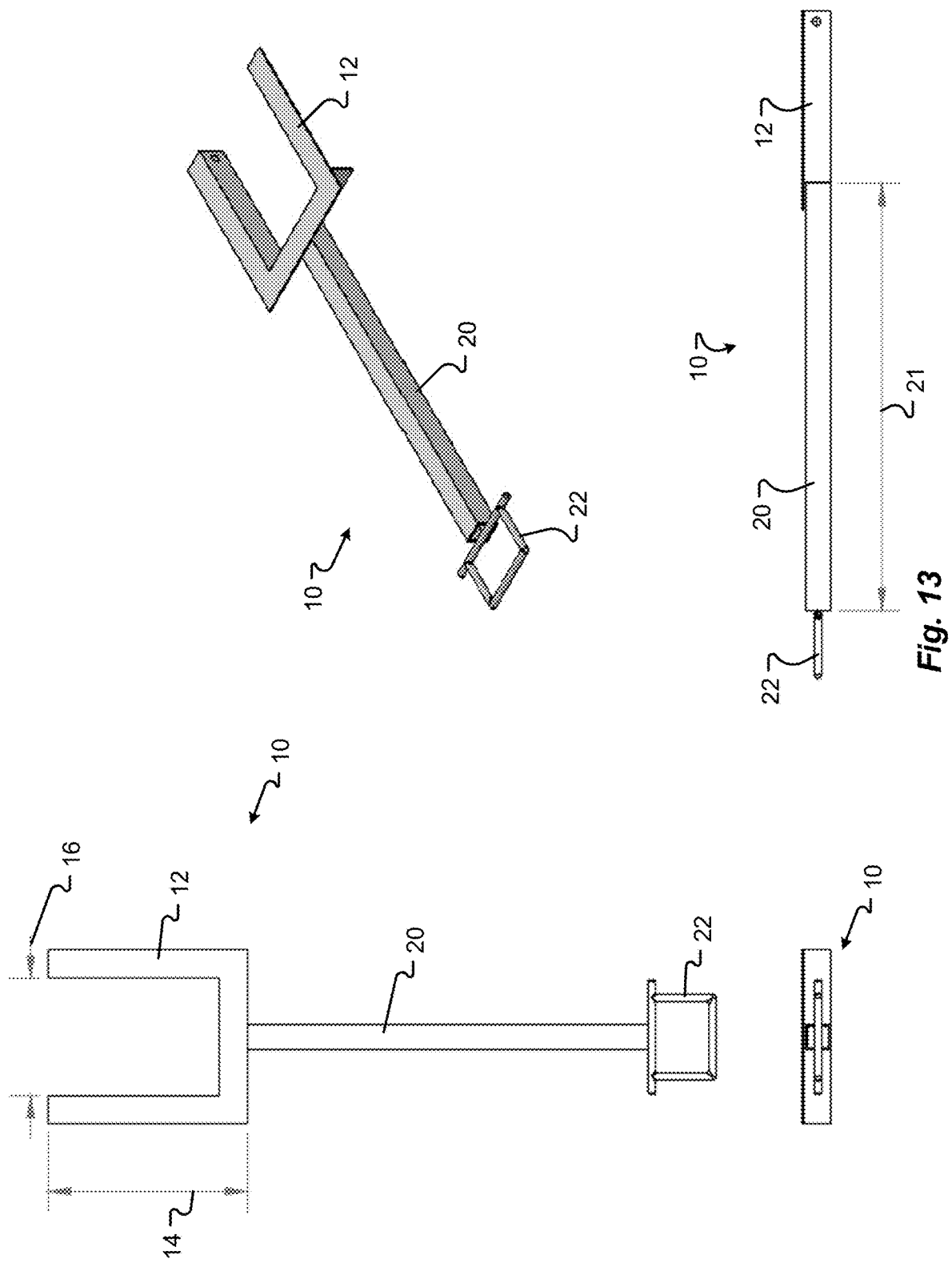
FIG. 13 provides various views of a handle of the present invention for the cart of FIG. 1.

Referring now to FIG. 13, the handle 10 generally includes a coupling 12, a tongue 20 with a ring 22 for grasping by the user. The coupling has a length 14 of between about 12 inches and about 16 inches. In one embodiment, the coupling 12 includes an interior aperture with a width 16 of between about 9.3 inches and about 7.2 inches and, in another embodiment, about 8.25 inches. The tongue 20 has a length 21 of between about 24 inches and about 36 inches. Optionally, one or more of the coupling 12 and tongue 20 may be constructed from pieces of 2 inch by ⅛ inch angle iron that are welded together.

Figure 14:
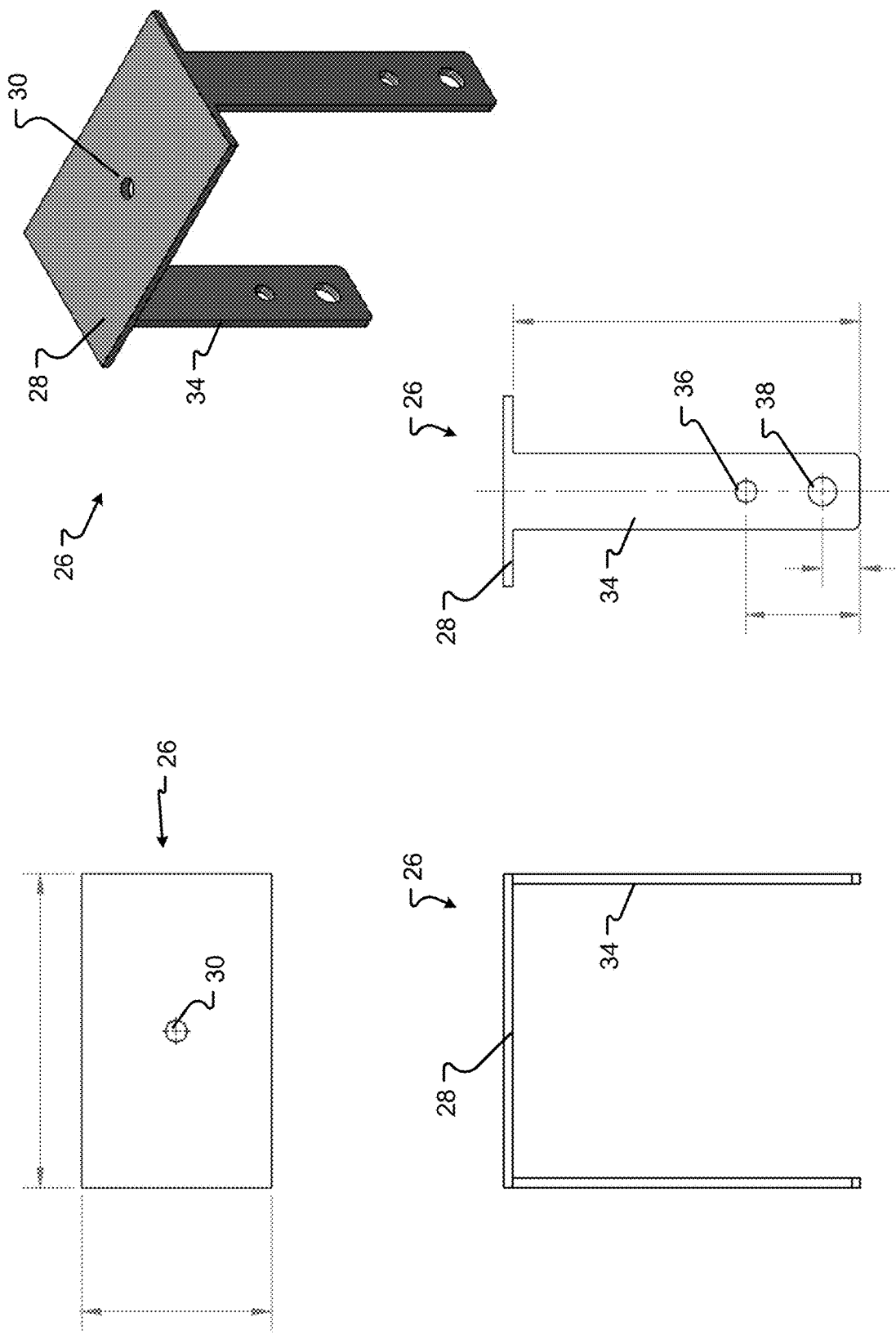
FIG. 14 illustrates a bracket of one embodiment for the cart in a variety of views.

Referring now to FIG. 14, the bracket 26 is formed of a sheet material that is between about 0.2 inches and about 0.3 inches thick. The plate member 28 of the bracket 26 includes the pivot aperture 30. The pivot aperture 30 may receive a fixture to interconnect the bracket 26 to front frame 50. The pivot aperture 30 may be substantially centered in the plate member. In one embodiment, the plate member 28 has a width of between about 3 inches to about 7 inches and a length of between about 6.2 inches and about 10.3 inches.

The supports 34 are substantially parallel and are generally perpendicular to the plate member 28. Apertures 36, 38 for the handle 10 and front axle 44 are formed through each support 34. In one embodiment, the axle apertures 38 have a diameter of about 0.75 inches and are between about 0.75 inches and 1.25 inches from free ends of the supports 34. The handle apertures 36 are about 0.56 inches in diameter and are spaced about 2.5 inches to about 3.5 inches from the support 34 free ends.

Figure 15:
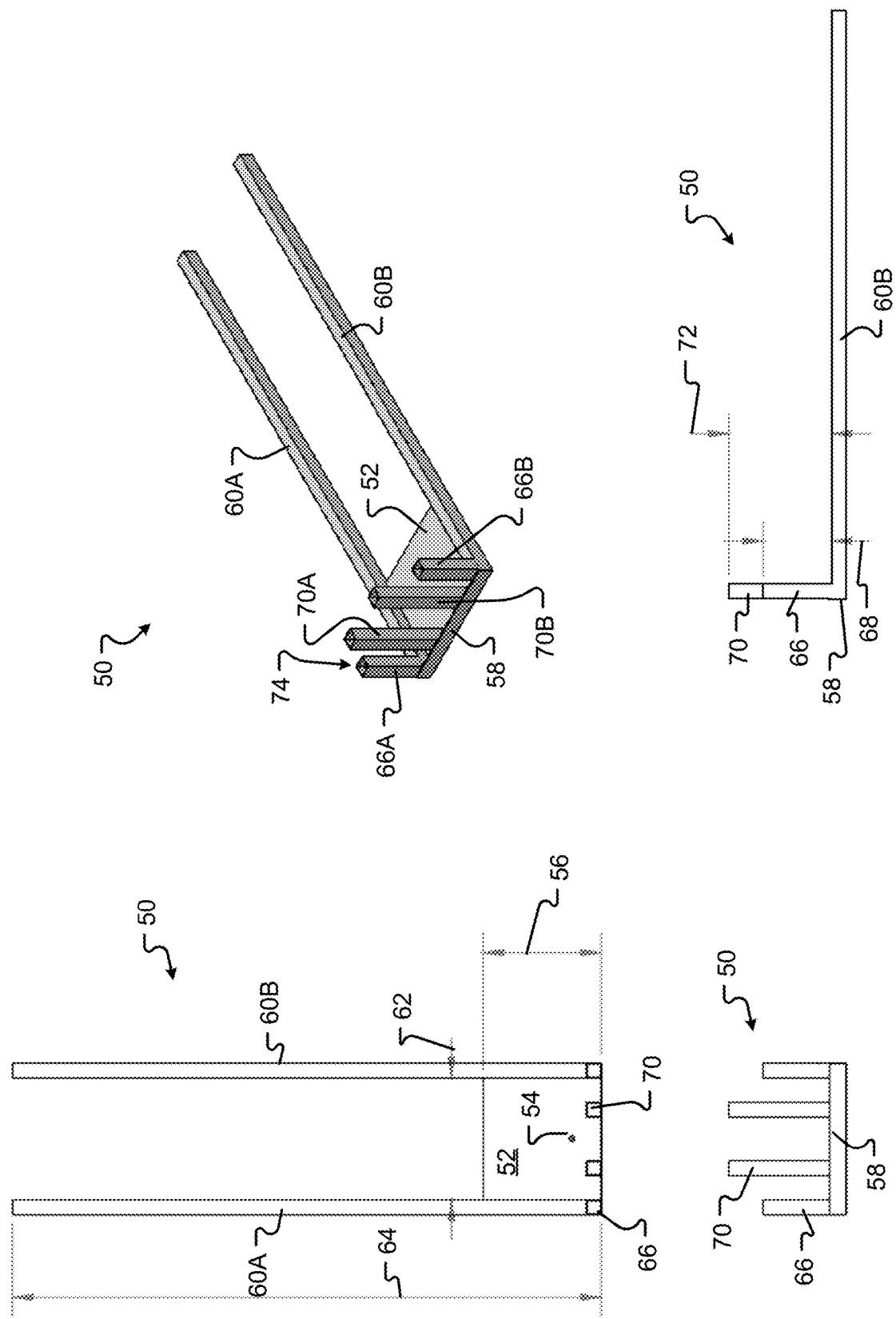
FIG. 15 illustrates a front frame according to one embodiment of the present invention.

Referring now to FIG. 15, the front frame 50 include the planar member 52 which may have a width 56 of between about 10 inches and about 14 inches in one embodiment of the present invention. Optionally, the planar member 52 may be about ⅛ inch thick. An aperture 54 with a diameter of about 0.56 inches for a fixture interconnected to the bracket 26 is formed through the planar member 52.

The front longitudinal members 60 have a length 64 of between about 50 inches and about 70 inches. The front longitudinal members 60 are separated by a width 62 of between about 11 inches and about 14 inches, or optionally, about 12.5 inches. In one embodiment, an exterior width of each of the front longitudinal members is between about 1.25 inches and 1.75 inches and, in another embodiment, about 1.5 inches. Optionally, the front longitudinal members 60 may be made of square metal tubing, such as 1.75 inch square steel tubing with a thickness of about 0.12 inches.

The protruding members 66, 70 are positioned substantially flush to the transverse member 58. In one embodiment, the outer protruding members 66 have a length 68 of between about 5 inches and about 9 inches. The inner protruding members 70 are spaced between about 1.5 inches and about 3.5 inches from interior edges of each outer protruding member 66. In another embodiment, the inner protruding members 70 are spaced about 2.5 inches from the interior edges such that the inner protruding members 70A, 70B are separated by between about 4.4 inches and about 4.6 inches. In one embodiment, the inner protruding members 70 have a length 72 between about 8.5 inches and about 12.5 inches.

Figure 16:
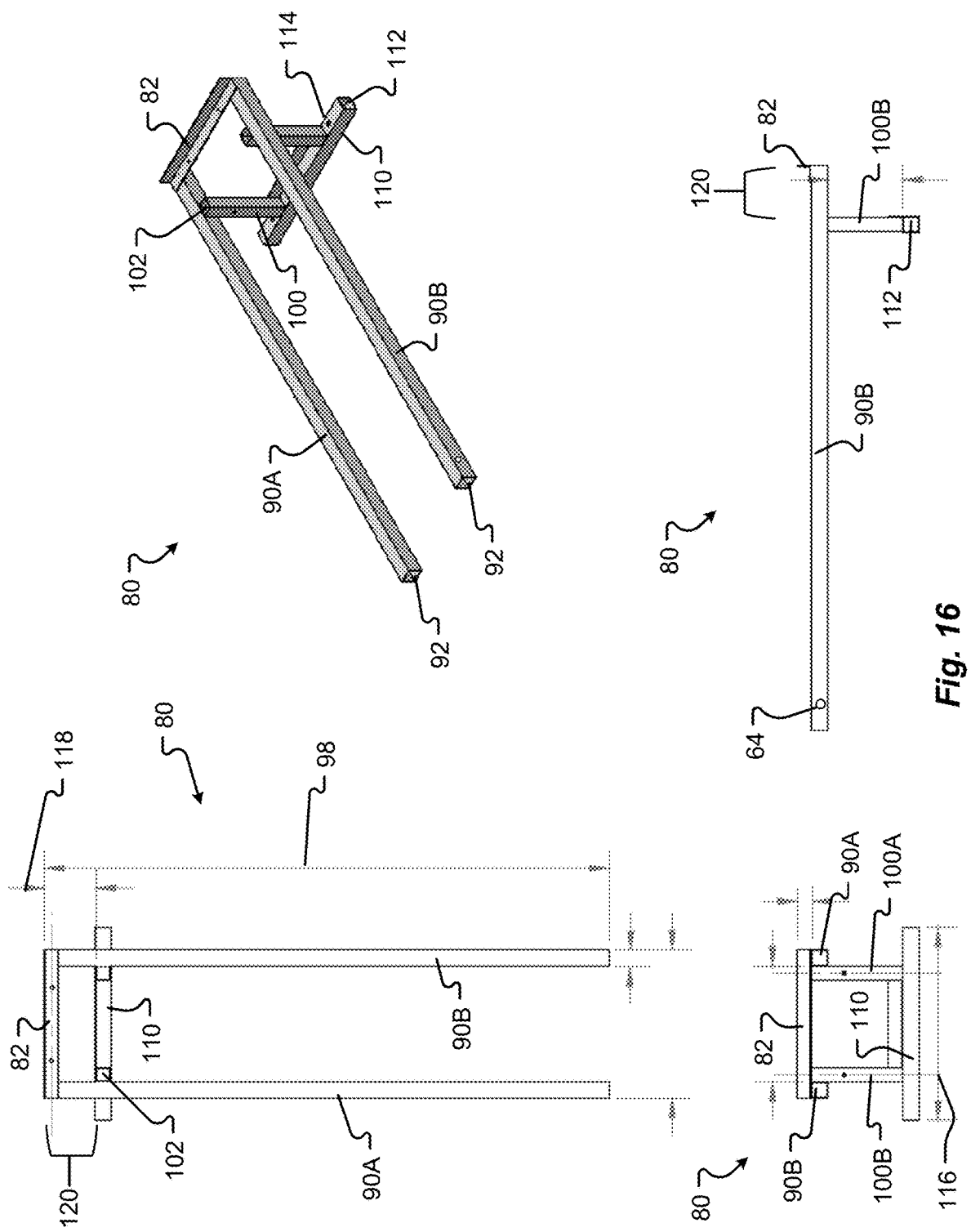
FIG. 16 provides a variety of views of a rear frame of one embodiment for the cart of FIG. 1.

Referring now to FIG. 16, the transverse member 82 of the rear frame 80 has a length of between about 14.7 inches and about 16.8 inches, or optionally, about 15.75 inches. Optionally, the transverse member 82 has a vertical extension which extends between about 1 inches and about 3 inches above the rear longitudinal members 90.

The rear longitudinal members 90 have a length 98 of between about 50 inches and about 70 inches. The rear longitudinal members 90 are spaced between about 11 inches and about 14 inches apart. In one embodiment, the longitudinal members are about 12.5 inches apart. In one embodiment, an exterior width of each of the front longitudinal members is between about 1.5 inches and 2.0 inches and, in another embodiment, about 1.75 inches. The rear longitudinal members 90 are substantially hollow and include apertures 92 with an interior width about equal to, and not less than, the exterior width of the front longitudinal members 60.

In one embodiment, the vertical members 100 have a length of between about 6 inches and about 10 inches. In this manner, the rear wheels 140 are spaced below a plane defined by top surfaces of the rear longitudinal members 90. The axle support 110 has a length 116 of between about 22 inches and about 19 inches. The axle support 110 may be substantially hollow and have apertures 112 with an interior width that is about equal to, and slightly larger than, an exterior width of the axle carriers 124. In one embodiment, the width of the apertures 112 is between about 1.25 inches and about 2.0 inches.

In one embodiment, the vertical members 100 and axle carrier 110 are spaced from the transverse member 82 by a predetermined distance 118. In one embodiment, the distance is between about 4 inches and about 7 inches. The rear frame 80 thus defines an equipment carrier 120. The equipment carrier 120 may be sized to hold a variety of different equipment associated with showing livestock. The vertical projection of the transverse member 82 may extend a predetermined height above the rear longitudinal members 90 to further support items transported on the equipment carrier 120. In one embodiment, the equipment carrier 120 functions to hold a blower, a fan, or similar livestock-related equipment securely in place while the cart 2 is in motion, in a manner similar stall elements supported by protruding members 66, 70 of the front frame 50. Thus, the cart 2 may transport both livestock and livestock-related equipment at the same time.

In one embodiment, the distance 118 is selected to align the transverse member 82 with a plane 88 tangent to the rear wheels 140, as illustrated in in FIG. 6. The plane 88 is substantially parallel to the pivot axis 32. In this manner, the cart 2 may be stored in a vertical alignment supported by the rear wheels 140 and the transverse member 82, for example, when the plane 88 is parallel to the ground.

Figure 2:
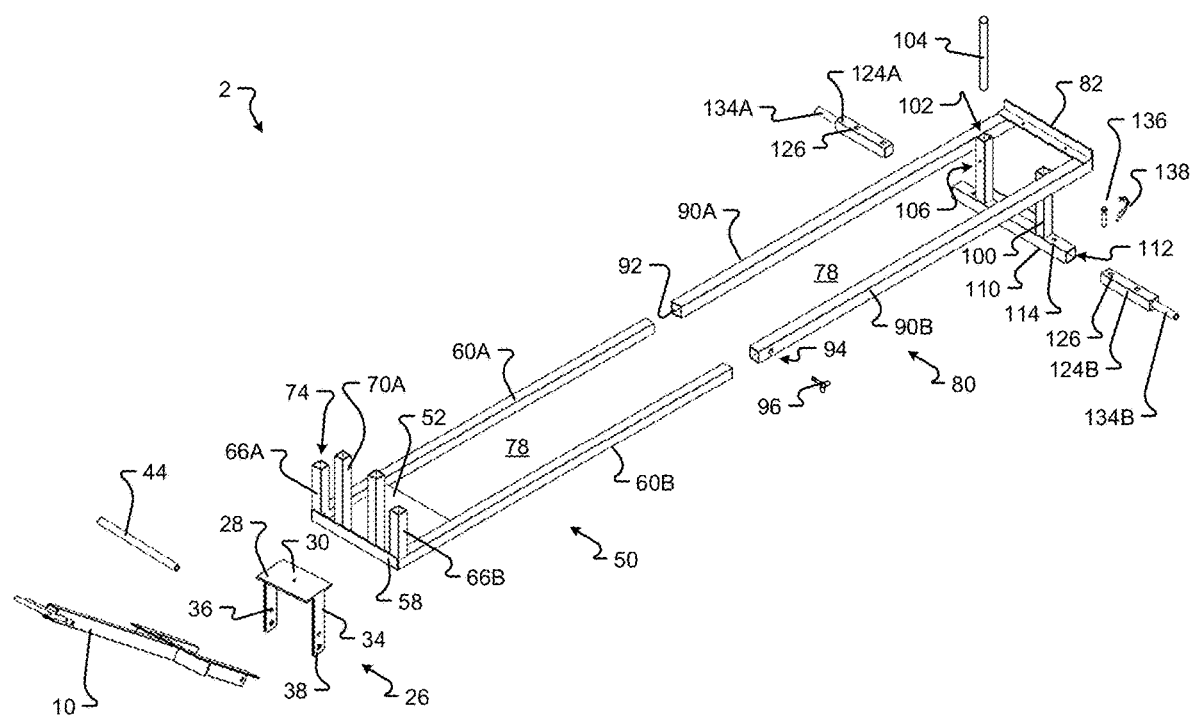
FIG. 2 is an exploded perspective view of the cart of FIG. 1.
Figure 9:
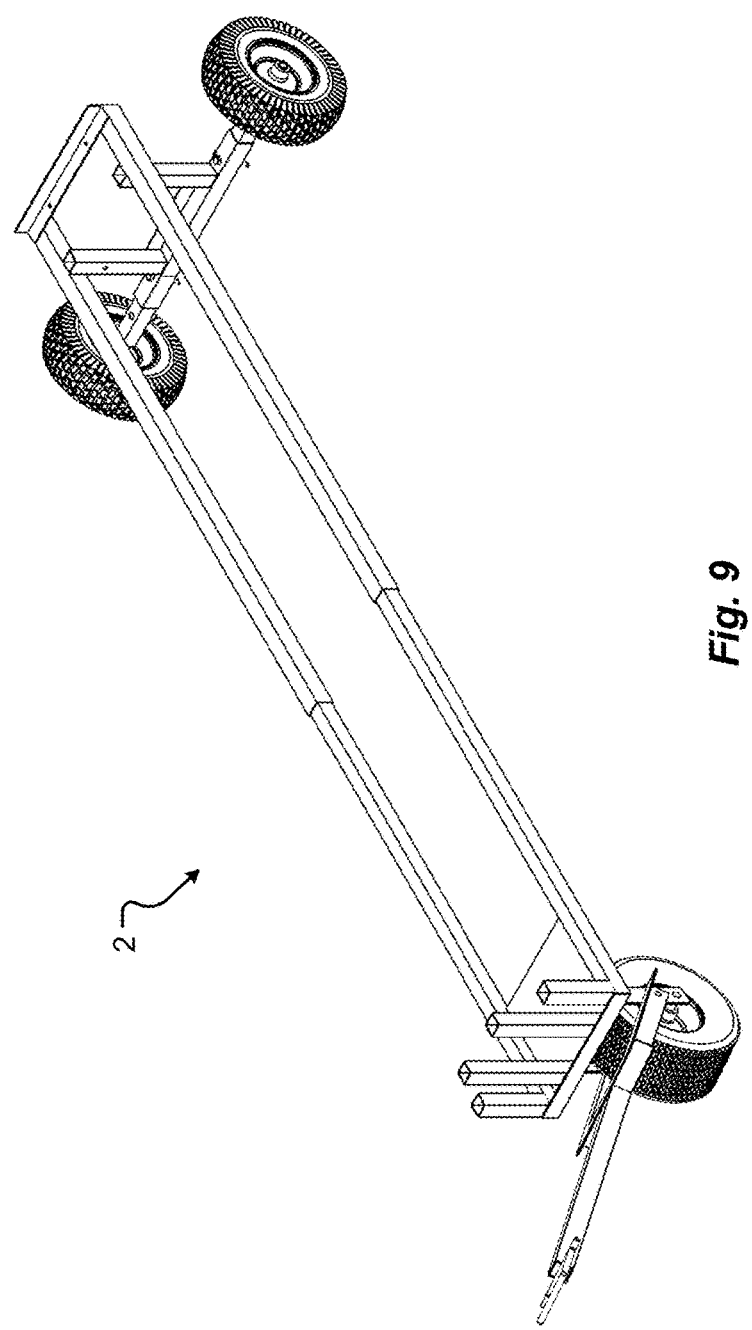
FIG. 9 is another front perspective view of the cart of FIG. 1 with the cart in an extended configuration.
Figure 10:
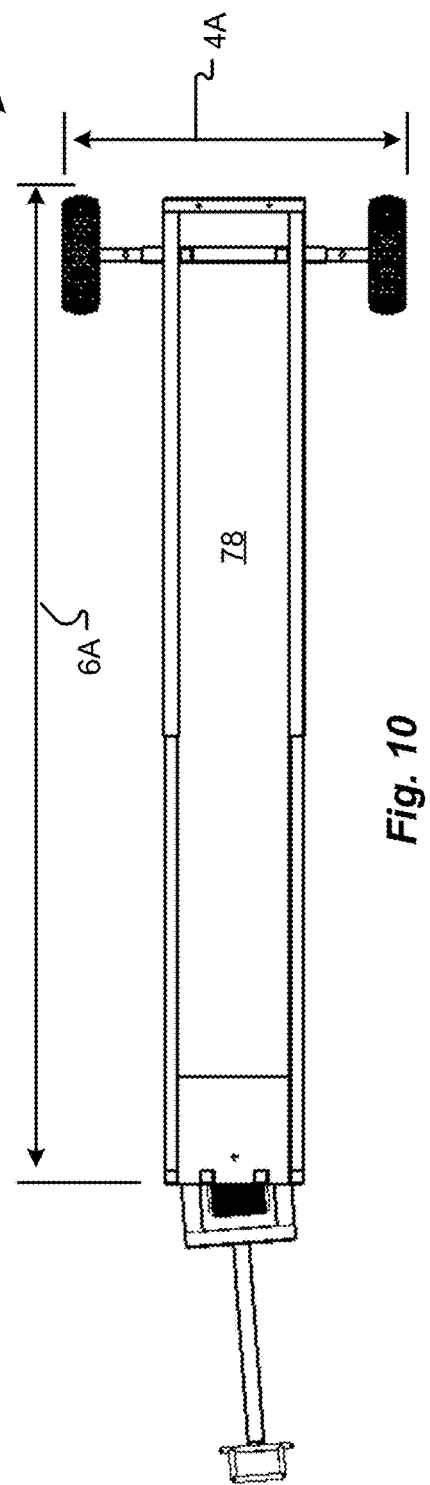
FIG. 10 is a top plan view of the cart in the extended configuration of FIG. 9.
Figure 11:
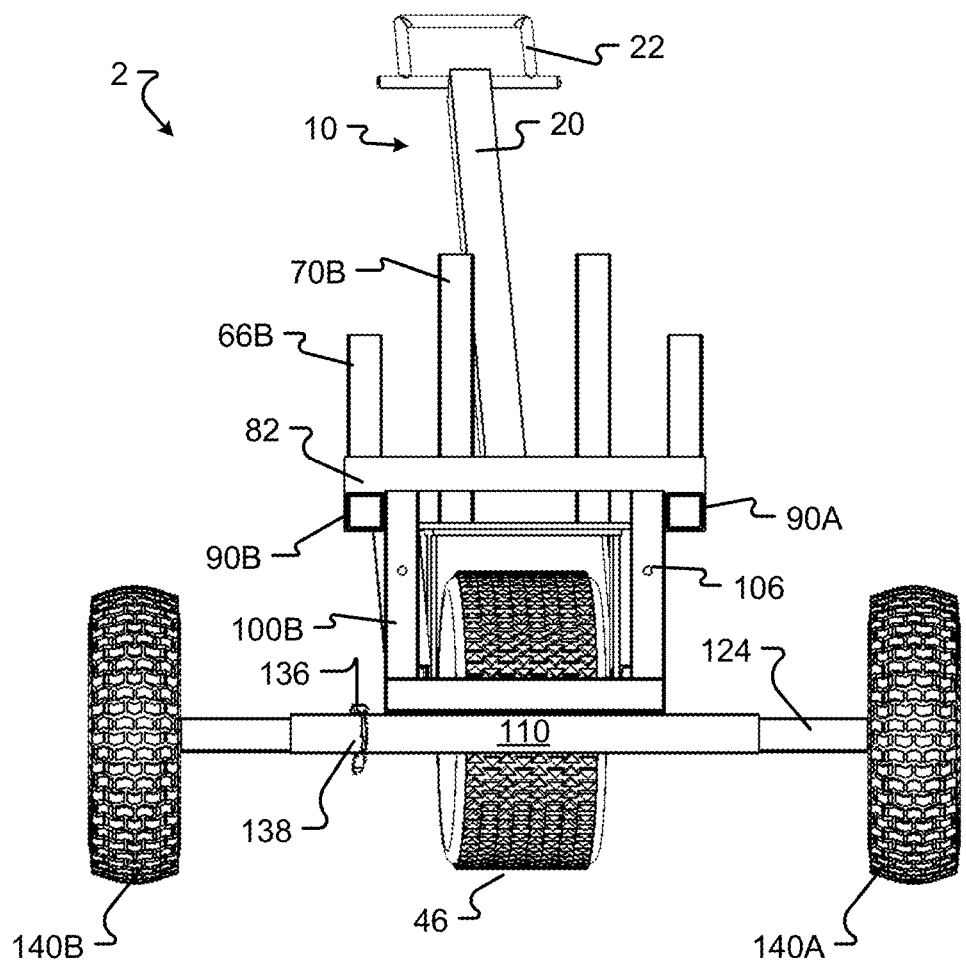
FIG. 11 is a rear elevation view of the cart in the extended configuration of FIG. 9.

Referring now to FIG. 17, the axle carrier 124 may have a length 128 of between about 7.5 inches and about 10 inches. In one embodiment, the rear axle 134 is a unitary element that passes through each axle carrier 124A, 124B, such as illustrated in FIG. 3. Optionally, the rear axle 134 may comprise a first axle portion 134A and a second axle portion 134B as generally illustrated in FIG. 2. Accordingly, in one embodiment, the axle carriers 124 each include a receiver 130 for one of the rear axle portions 134A, 134B. The receiver 130 may be a generally cylindrical structure projecting within an interior of the axle carrier 124. Optionally, the rear axle portions 134A, 134B may be welded or otherwise interconnected to the receiver 130. In one embodiment, the rear axle 134 projects from about 3.5 inches to about 5.5 inches from the axle carrier 124.

The axles 44, 134, front frame 50, and rear frame 80 may be made of any suitable material, particularly metals or metal alloys, including but not limited to angle iron and aluminum.

Figure 18A:
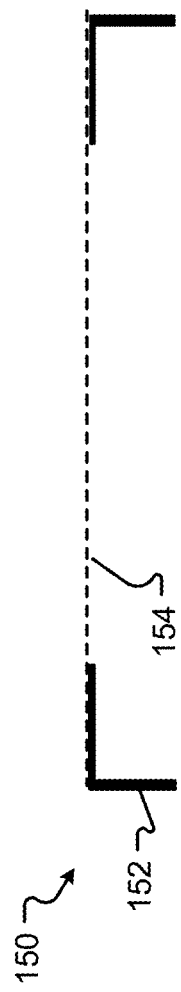
FIG. 18A is a cross-section view of a grate plate of one embodiment of the present invention.
Figure 18B:
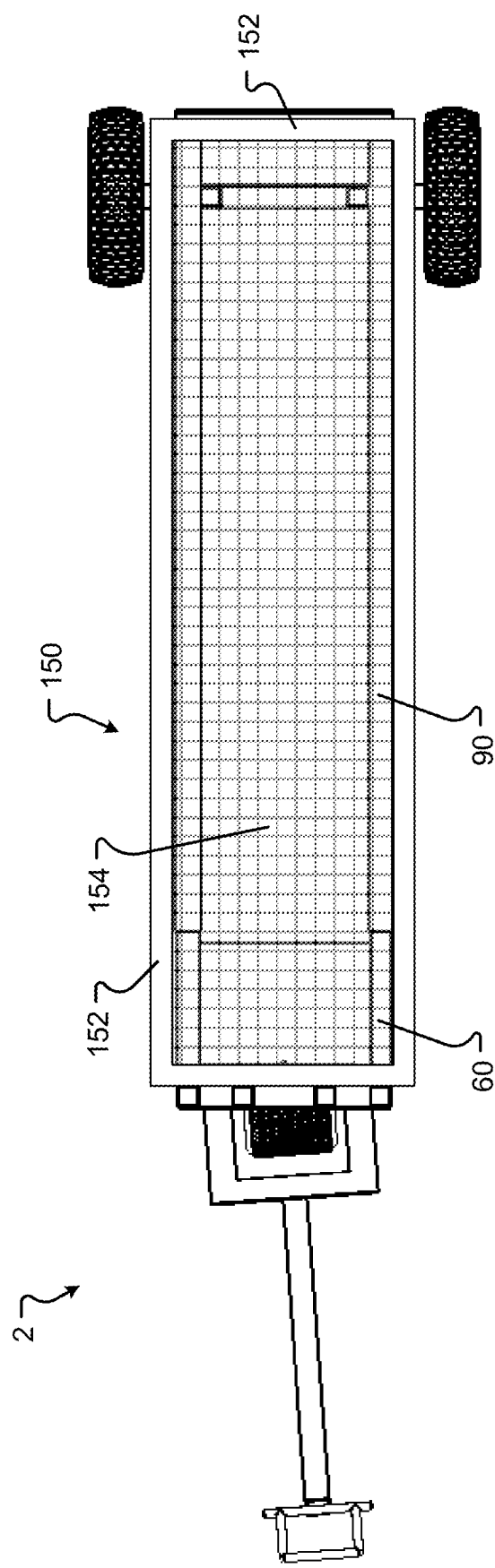
FIG. 18B is a top plan view of the grate plate of FIG. 18A in a position of use with the cart of FIG. 1.

Referring now to FIG. 18A, a grate plate 150 for a cart 2 is generally illustrated. The grate plate 150 may be used in conjunction with the cart 2 of all embodiments of the present invention. The grate plate 150 generally comprises a frame 152 and a web or mesh 154. The mesh 154 may comprise metal grating with apertures of any desired size. The frame 152 can be formed of angle iron spaced to fit over the longitudinal members 60, 90 as illustrated in one embodiment in FIG. 18B.

Referring now to FIG. 19, a livestock feeding/drinking trough 160 for the cart 2 is illustrated. The trough 160 may be used in conjunction with carts 2 of all embodiments of the present invention. The trough 160 is configured to releasably mate with the cart 2 such that the trough 160 is held securely in place while the cart 2 is in motion.

In one embodiment, the trough 160 comprises grooves 162 for receiving the longitudinal members 60, 90 of the cart 2. Optionally, the grooves 162 are sized to frictionally retain the longitudinal members 60, 90. Additionally, or alternatively, a latch, fastener, or other retention mechanism may be provided to selectively secure the trough 160 to the cart 2, such as by pinning or clipping the trough to the longitudinal members. In this manner, inadvertent and unintended movement of the trough with respect to the cart 2 is reduced or eliminated.

As one of skill in the art will appreciate, the trough 160 may be heavy and awkward to move when its chamber 164 it is filled with feed or water. Accordingly, in one embodiment the trough 160 may be held in place by the cart 2 such that livestock can eat and/or drink from the chamber 164 without requiring the trough 160 to be offloaded from the cart 2. In one embodiment, the trough 160 has a height selected to enable livestock to eat or drink from the chamber 164 when the trough is on the cart 2. Optionally, a drain plug may be positioned within the chamber 164 to drain liquids from the trough.

Figure 20A:
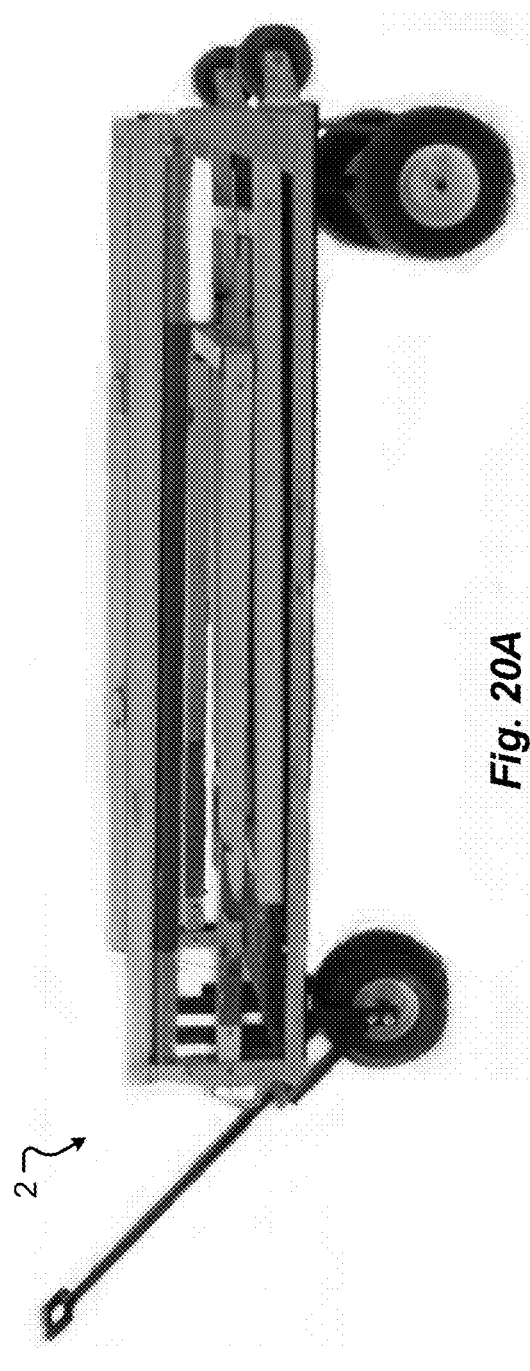
FIGS. 20A-20D are photographs of the cart of embodiments of the present invention loaded with a variety of equipment.
Figure 20B:
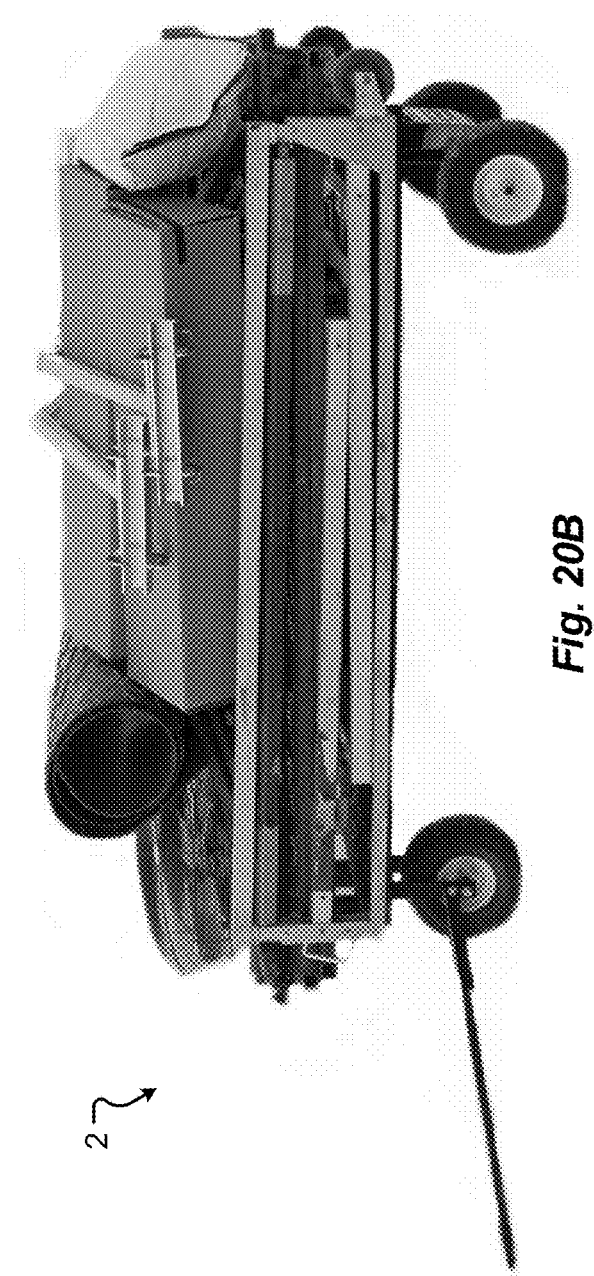
Figure 20C:
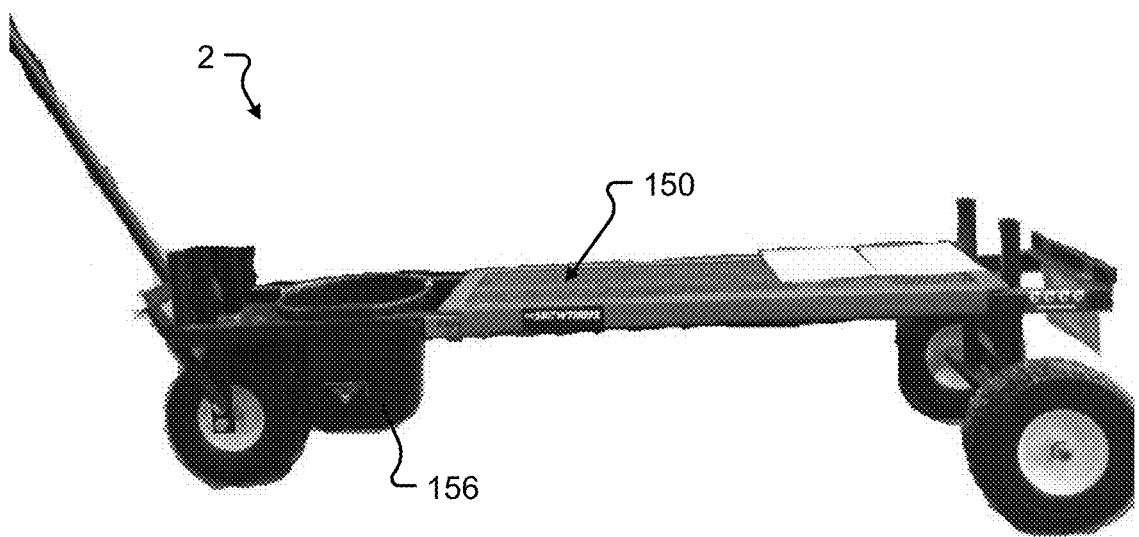
Figure 20D:
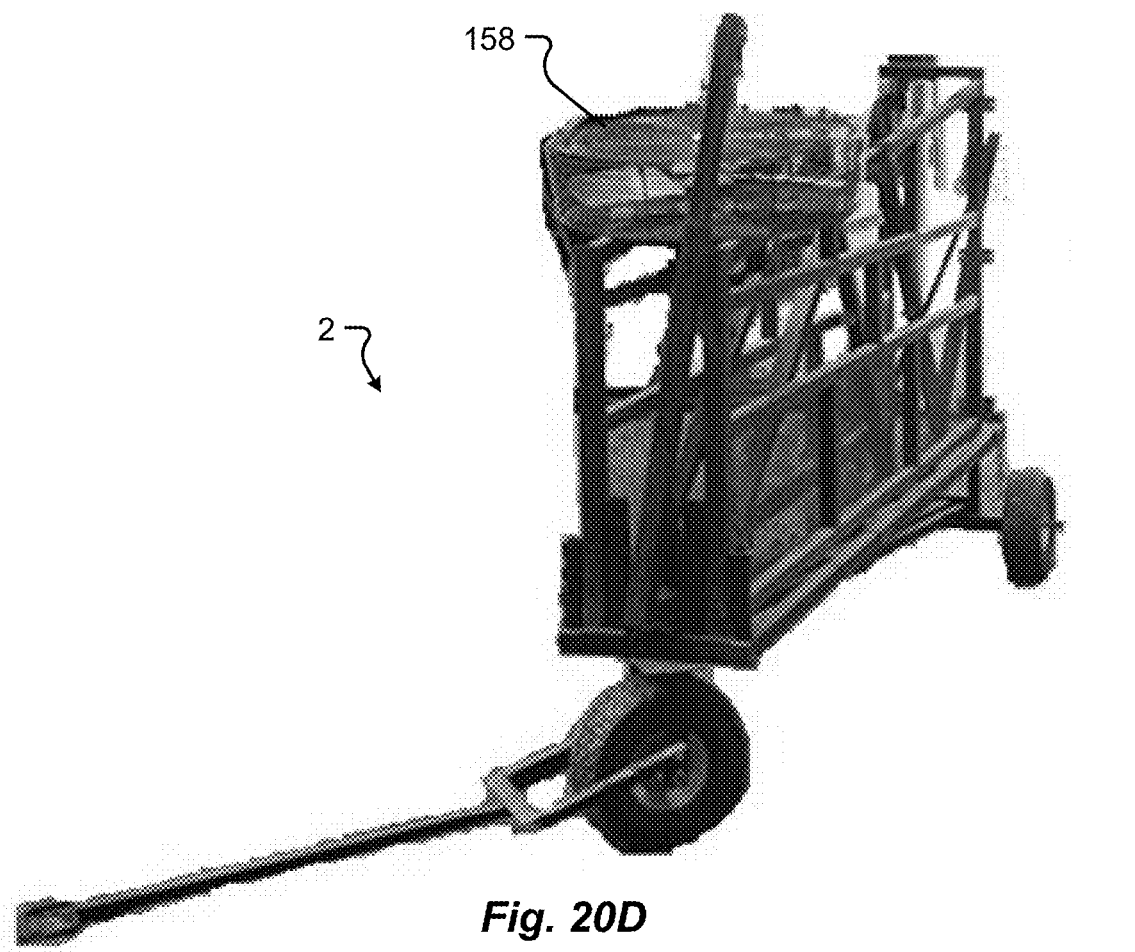

Referring now to FIGS. 20A-20B, photographs of carts 2 of embodiments of the present invention are shown loaded with a variety of equipment. FIG. 20C illustrates a cart 2 configured to carry a bucket 156 and a grate plate 150. The bucket 156 is received within the cavity 78 between the front and rear longitudinal members 60, 90. FIG. 20D shows a cart 2 carrying a livestock stall generally vertically supported as well as a fan 158 with its pole received in a protruding member of the front frame 50. One of skill in the art will appreciate that the cart 2 of embodiments of the present invention may be configured to transport blocking chutes, stalls, fans, shavings, feed, hay, coolers, an upright blower stand, and other equipment and tack used at livestock shows.

The invention illustratively disclosed herein suitably may be practiced in the absence of any element which is not specifically disclosed herein. It is apparent to those skilled in the art, however, that many changes, variations, modifications, other uses, and applications of the invention are possible, and also changes, variations, modifications, other uses, and applications which do not depart from the spirit and scope of the invention are deemed to be covered by the invention, which is limited only by the claims which follow.

The foregoing discussion of the invention has been presented for purposes of illustration and description. The foregoing is not intended to limit the invention to the form or forms disclosed herein. In the foregoing Detailed Description of the Invention, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of the Invention, with each claim standing on its own as a separate preferred embodiment of the invention.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

The invention claimed is:

1. A cart with an adjustable length and width, comprising:
 a front frame including:
  a planar member;
  two front longitudinal members fixedly interconnected to the planar member; and at least two protruding members arranged substantially vertically with respect to the planar member;

a bracket pivotally interconnected to the planar member and including a plate member, the plate member being positioned below the planar member;

a first support extending downwardly from the plate member;

a second support extending downwardly from the plate member;

only one front wheel interconnected to the bracket between the first and second supports;

a handle pivotally interconnected to the bracket;

a rear frame including:

a transverse member;

two rear longitudinal members interconnected to the transverse member, each of the rear longitudinal members having a substantially hollow interior and an aperture distal to the transverse member, the aperture sized to selectively receive a corresponding front longitudinal member such that a length of the cart is adjustable;

a vertical member extending downwardly from each of the two rear longitudinal members; and an axle support interconnected to the two vertical members, the axle support having an interior space accessible by opposing openings; and two axle carriers each including a rear wheel, wherein each axle carrier is selectively receivable within one of the opposing openings of the axle support such that a width of the cart is adjustable, wherein the front frame and the rear frame are made of a metal.

2. The cart of claim 1, wherein the cart has only three wheels comprising the one front wheel and two rear wheels.

3. The cart of claim 1, wherein each of the two axle carriers includes a body with a rectangular shape and a square cross section, and a closed end with an aperture to receive an axle portion for one of the rear wheels.

4. The cart of claim 3, wherein each axle carrier includes an axle receiver connected to the closed end, the axle receiver having a generally cylindrical shape extending within an interior of the axle receiver.

5. The cart of claim 4, further comprising:

a first rear axle portion welded to a first one of the two axle receivers, a first one of the two rear wheels interconnected to the first rear axle portion; and a second rear axle portion welded to a second one of the two axle receivers, a second one of the two rear wheels interconnected to the second rear axle portion.

6. The cart of claim 4, wherein each axle carrier further comprises at least two apertures formed transverse to a longitudinal axis of each axle carrier, the at least two apertures alignable with at least one aperture formed in the axle support.

7. The cart of claim 6, further comprising a fixture received within an aperture of an axle carrier aligned with an aperture of the axle support.

8. The cart of claim 1, wherein the two front longitudinal members comprise only a first front longitudinal member spaced from a second longitudinal member to define an open cavity between the two front longitudinal members.

9. The cart of claim 1, further comprising a lock aperture in at least one of the rear longitudinal members, the lock aperture to receive a fixture to fix one of the front longitudinal members within the hollow interior of the rear longitudinal member.

10. The cart of claim 1, wherein each of the two vertical members of the rear frame is substantially hollow and includes an opening, and wherein a drop pipe is positioned in an opening of one of the two vertical members.

11. The cart of claim 1, wherein an axle portion is welded to each of the two axle carriers, and wherein one of the rear wheels is interconnected to each axle portion.

12. The cart of claim 1, wherein the handle further comprises:

a longitudinal tongue;

a cross member connected to the longitudinal tongue, the cross member oriented approximately perpendicular to the longitudinal tongue; and a first extension and a second extension connected to the cross member and extending away from the longitudinal tongue, the first extension spaced from the second extension to define an interior space, wherein the first extension is pivotally interconnected to the first support of the bracket and the second extension is pivotally interconnected to the second support of the bracket with the only one front wheel positioned within the interior space.

13. The cart of claim 1, wherein the two vertical members of the rear frame are spaced from the transverse member by an amount about equal to a diameter of the rear wheels such that the rear wheels and the transverse member are aligned with a second plane substantially perpendicular to the planar member.

* * * * *